(12) United States Patent
Kim et al.

(10) Patent No.: US 11,952,504 B2
(45) Date of Patent: *Apr. 9, 2024

(54) EASILY-PEELABLE PAINT COMPOSITION

(71) Applicant: HAE KWANG CO., LTD., Jingwang-ro (KR)

(72) Inventors: Myunsoo Kim, Gwacheon-si (KR); Hyunjong Shin, Siheung-si (KR)

(73) Assignee: HAE KWANG CO., LTD., Jingwang-Ro (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/625,943

(22) PCT Filed: Jul. 6, 2021

(86) PCT No.: PCT/KR2021/008556
§ 371 (c)(1),
(2) Date: Jan. 10, 2022

(87) PCT Pub. No.: WO2022/025466
PCT Pub. Date: Feb. 3, 2022

(65) Prior Publication Data
US 2022/0363936 A1    Nov. 17, 2022

(30) Foreign Application Priority Data

Jul. 27, 2020 (KR) .................. 10-2020-0093206
Jun. 23, 2021 (KR) .................. 10-2021-0081338

(51) Int. Cl.
*C09D 129/14* (2006.01)
*C09D 7/40* (2018.01)
*C09D 7/43* (2018.01)
*C09D 7/61* (2018.01)
*C09D 7/65* (2018.01)

(52) U.S. Cl.
CPC ............. *C09D 129/14* (2013.01); *C09D 7/43* (2018.01); *C09D 7/61* (2018.01); *C09D 7/65* (2018.01); *C09D 7/69* (2018.01)

(58) Field of Classification Search
CPC ................................. C09D 7/69; C09D 129/14
See application file for complete search history.

(56) References Cited

U.S. PATENT DOCUMENTS

| 6,964,989 B1 * | 11/2005 | Fang ................... C09D 125/14 |
| | | 524/508 |
| 8,263,231 B2 | 9/2012 | Mesa |
| 8,524,825 B2 | 9/2013 | Register et al. |
| 9,688,888 B2 * | 6/2017 | Moran .............. B32B 17/10174 |
| 2011/0034618 A1 * | 2/2011 | Register ............... C09D 129/14 |
| | | 524/593 |

FOREIGN PATENT DOCUMENTS

| CN | 101652435 A | | 2/2010 |
| CN | 103146514 A | * | 6/2013 |
| JP | 05-112742 A | | 5/1993 |
| JP | 05-171068 A | | 7/1993 |
| JP | H10314688 A | | 12/1998 |
| JP | 2006-096794 A | | 4/2006 |
| JP | 2017170793 A | | 9/2017 |
| KR | 10-0773783 B1 | | 11/2007 |
| KR | 10-1714740 B1 | | 3/2017 |
| KR | 10-2019-0043947 A | | 4/2019 |
| WO | WO-2018067859 A1 | * | 4/2018 |

OTHER PUBLICATIONS

Machine translation of CN 103146514 A, published Jun. 12, 2013, retrieved from espacenet.com.*
In Office Action for corresponding IN Patent Application No. 202337008374, dated Oct. 3, 2023, pp. 1-6.
U.S. Office Action for U.S. Appl. No. 17/983,877, dated Dec. 4, 2023, pp. 1-7.

* cited by examiner

*Primary Examiner* — Vickey Nerangis
(74) *Attorney, Agent, or Firm* — TAROLLI, SUNDHEIM, COVELL & TUMMINO L.L.P.

(57) ABSTRACT

The present disclosure relates to an easily-peelable paint composition capable of easily peeling off a coating layer for restoring an object to its original condition. The easily-peelable paint composition of the present disclosure is capable of not only peeling off paints from materials to which the paints are applied for easy restorations to their original conditions, but also protecting the materials with excellent durability while being applied.

6 Claims, 3 Drawing Sheets

[FIG. 1]
CONDITION BEFORE PEEL-OFF FROM GLASS
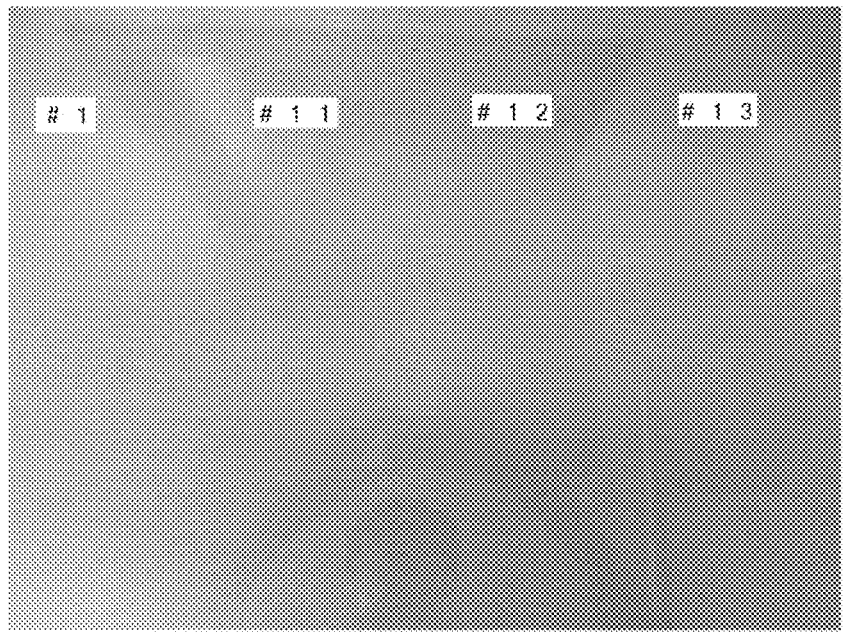
CONDITION AFTER PEEL-OFF FROM GLASS

[FIG. 2]
CONDITION BEFORE PEEL-OFF FROM WALLPAPER
CONDITION AFTER PEEL-OFF FROM WALLPAPER
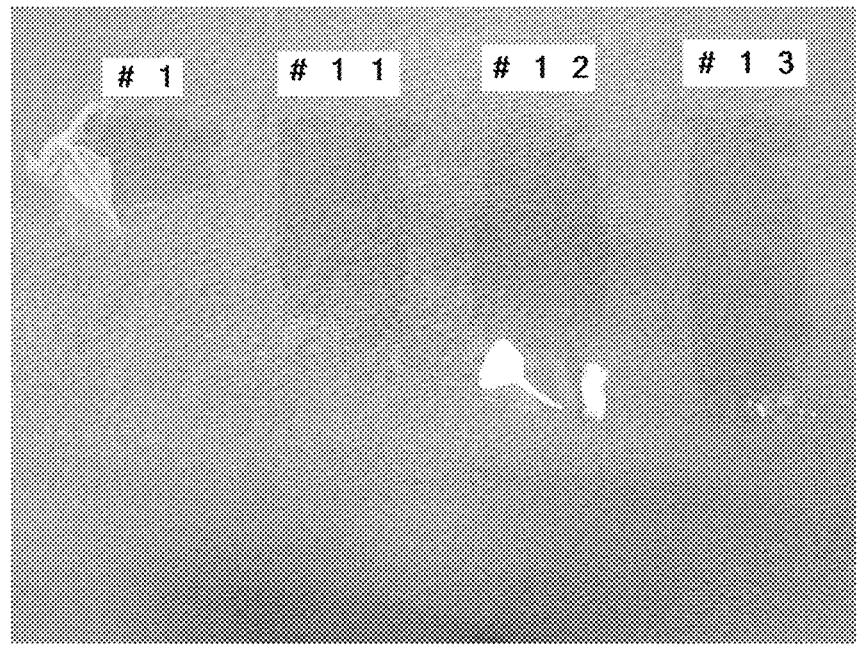

[FIG. 3]
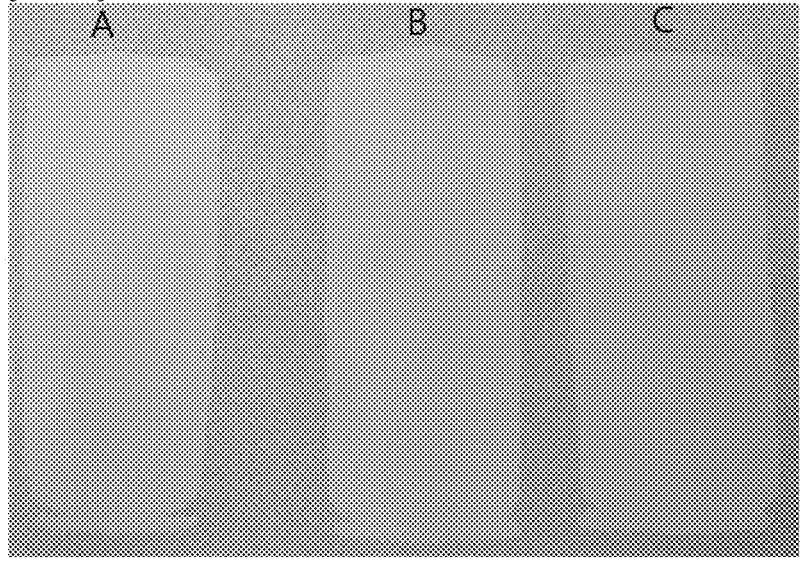
[FIG. 4]
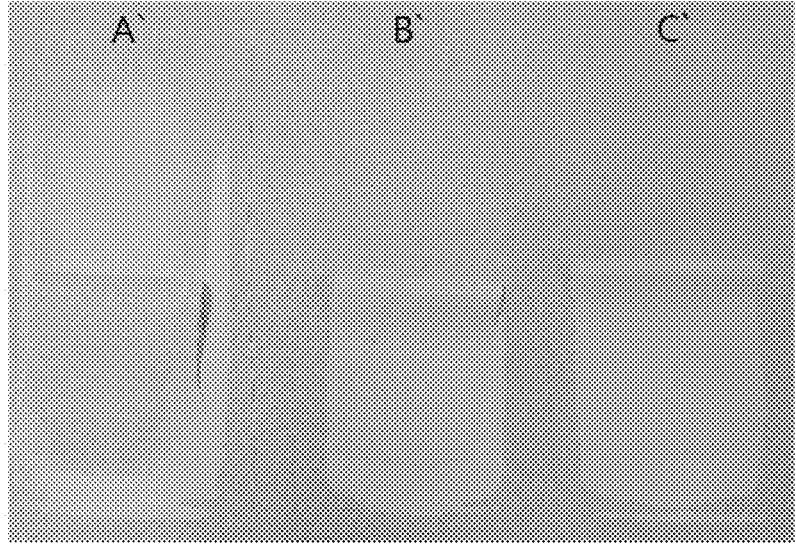

EASILY-PEELABLE PAINT COMPOSITION

RELATED APPLICATIONS

The present invention is a U.S. National Stage under 35 USC 371 patent application, claiming priority to Serial No. PCT/KR2021/008556, filed on Jul. 6, 2021, which claims priority to Korean Patent Application No. 10-2020-0093206, filed on Jul. 27, 2020 and Korean Patent Application No. 10-2021-0081338 filed on Jun. 23, 2021; the entireties of all are hereby incorporated herein by reference.

TECHNICAL FIELD

The present disclosure relates to an easily-peelable paint composition, and more particularly, to an easily-peelable paint composition capable of easily peeling off a coating layer to restore an object to its original condition in a case where a user wants to change the color or design of the object or use the object in its original condition.

BACKGROUND ART

In general, paints are fluid materials that are widely applied onto surfaces of objects to form thin coating layers, and they are dried and hardened over time to not only protect the surfaces of the objects but also enhance an aesthetic value. Particularly, such paints are often applied to various structures, including buildings, to not only enhance the appearance of the structures and make them look good but also prevent surface damage, including corrosion, and improve durability.

Examples of paints mainly used for protecting objects and structures are oil paints, enamel paints, and aqueous paints. These paints are effective in not only protecting buildings and materials but also increasing their aesthetic values and improving insulation and heat resistance.

Typical coating materials such as paints are being developed mainly for the purpose of improving adhesion to objects and structures to improve durability. Therefore, they are not easy to peel off and restoring to the original conditions once dried/hardened after being applied to objects or structures. In particular, when applied to wallpaper or the like, the typical paints cannot be peeled off at all, or the wallpaper will be damaged if such paints are peeled off forcibly. Therefore, restoration to original conditions is not possible with typical paints.

Furthermore, paints are also often applied on various types of materials, including wood, glass, and etc., but it is difficult to restore the wood, glass, or the like to their original conditions because it is extremely difficult to remove the paints without leaving marks.

Thus, to meet the needs for frequent changes in preferences, for unique items and spaces, and for easy usage suitable for DIY, paints or coating materials that can be easily peeled off from surfaces of materials (including, not limited to, paper, wood, glass, or etc.) to allow easy restoration for the materials to their original conditions regardless of space and time.

DISCLOSURE

Technical Problem

An object of the present disclosure is to provide an easily-peelable paint composition capable of not only easily peeling off paints from materials to which the paints are applied for easy restorations to original conditions but also protecting the materials with excellent durability while being applied, and designed as an aqueous type for safe use even in contact with human bodies inside buildings or structures such that the paint composition can be used regardless of location and purpose of use.

Other objects and technical features of the present disclosure will be presented more specifically by the following description of the disclosure, the claims, and the drawings.

Technical Solution

In accordance with an embodiment of the present disclosure, there is provided a paint composition that is easy to peel off from an object, the easily-peelable paint composition containing: 30 to 80 parts by weight, based on 100 parts by weight of the whole paint composition, of a polyvinyl butyral (PVB) resin; 1 to 5, based on 100 parts by weight of the whole paint composition, parts by weight of an additive including an antifoaming agent; and the balance of an aqueous solvent including water.

The PVB resin may have a molecular weight of 100,000 to 210,000 g/mole, and the PVB resin may have a particle size of 170 to 240 μm.

The paint composition may further contain an additional component including latex, an acrylic copolymer, polyvinyl acetate, urethane, or polyvinyl alcohol. In this case, a weight ratio of the PVB resin to the additional component in the paint composition may be 9 to 12:1.

The paint composition may further contain at least one of a releasing additive and an inorganic material.

The releasing additive may be contained in an amount of 1 to 20 parts by weight, the releasing additive being any one or more selected from the group consisting of a silicone oil, a silicone polymer, a silicone emulsion, a modified silicone oil or polymer, a siloxane or modified siloxane, a silicone rubber, a wax-type additive, a surfactant, an oil, and a silane.

The inorganic material may be contained in an amount of 5 to 40 parts by weight, the inorganic material being any one or more selected from the group consisting of $SiO_2$, $CaCO_3$, $BaSO_4$, talc, $Al(OH)_3$, $Al_2O_3$, and $TiO_2$.

The aqueous solvent may further include any one or more of alcohols, cellosolves, and carbitols.

The object may be a paper, wood, or glass material.

Advantageous Effects

The present disclosure relates to an easily-peelable paint composition capable of not only peeling off paints from materials to which the paints are applied for easy restorations to original conditions but also protecting the materials with excellent durability while being applied, such that which easily-peelable paint composition can be used for functional paints.

The easily-peelable paint composition of the present disclosure is designed eco-friendly as an aqueous type for safe use even in contact with human bodies inside buildings or structures such that the paint composition can be used regardless of location and purpose of use There is another advantage in that the easily-peelable paint of the present disclosure is eco-friendly as a non-toxic material because a coating film formed by applying and drying/hardening the easily-peelable paint can be peeled off, and the peeled-off coating film can be dissolved in alcohol for recycling.

In addition, by mixing or dispersing an insulating material in the easily-peelable paint of the present disclosure, cold protection and thermal insulation effects can be obtained when the easily-peelable paint with the insulating material is applied to an external window.

BRIEF DESCRIPTION OF DRAWING

FIG. 1 shows photographs for conditions of glass before and after peel-off depending on content ratios between PVB and latex.

FIG. 2 shows photographs for conditions of silk (PVC) wallpaper before and after peel-off depending on content ratios between PVB and latex.

FIG. 3 shows photographs comparing conditions between a paint A' to which a PVB resin is added alone, a paint B' containing a releasing additive, and a paint C' containing an inorganic material when applied to paper.

FIG. 4 shows photographs comparing conditions between paper to which a paint A' to which a PVB resin is added alone, a paint B' containing a releasing additive, and a paint C' containing an inorganic material are applied when the p are peeled off from the paper according to the present disclosure.

MODE FOR INVENTION

Hereinafter, preferred embodiments of the present disclosure will be described. However, the embodiments of the present disclosure may be modified in various different forms, and the scope of the present disclosure is not limited to the embodiments to be described below. In addition, the embodiments of the present disclosure are provided to more completely explain the present disclosure to those having ordinary knowledge in the art.

The present disclosure relates to an easily-peelable paint composition containing a polyvinyl butyral (PVB) resin, an additive including an antifoaming agent, and water. The easily-peelable paint composition may further contain a releasing additive or an inorganic material. When compared to a typical peelable coating material, the easily-peelable paint composition is capable of protecting a material to which the easily-peelable paint composition is applied with excellent durability, the easily-peelable paint composition can be easily peeled off even from wallpaper for easily restoring the material to its original condition, and the easily-peelable paint composition is formed as an aqueous type for safe use regardless of location and purpose of use, even inside buildings or structures, where the paint composition is likely to be in contact with human bodies.

The polyvinyl butyral (PVB) resin is dissolved in the water and painted on a surface of a material, and serves to protect the surface after the solvent is dried. It is preferable that the polyvinyl butyral (PVB) resin is easily peelable when a coating film needs to be peeled off after the material has been dried. The polyvinyl butyral (PVB) resin is a resin that is excellent in flexibility, tensile strength, and toughness in a water-dispersible form, and is advantageous in that the easily-peelable paint composition can be easily peeled off from the material.

The polyvinyl butyral (PVB) resin may be prepared by a condensation reaction between PVA and n-butyraldehyde. The PVB resin may be in an aqueous or emulsion type, and serves to protect the surface of the material once the solvent is dried after the surface of the material is painted. The PVB resin is a resin that is excellent in flexibility, tensile strength, and toughness, making it possible to easily peel the easily-peelable paint composition from the material.

The structure of the PVB resin may include a butyral group, an acetyl group, and a hydroxyl group represented by Formula 1 below as repeating units.

The PVB resin may have a structure including a butyral group, an acetyl group, and a hydroxyl group represented by the following Formula 1 as repeating units.

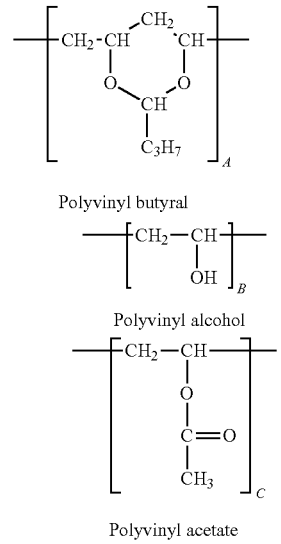

[Formula 1]

Polyvinyl butyral

Polyvinyl alcohol

Polyvinyl acetate

In particular, when the PVB resin has a molecular weight of 100,000 to 210,000 g/mole, its peelability and storage stability are excellent, and when the PVB resin has a particle size of 170 to 240 µm, its peelability and storage stability are further improved.

When an amount of the polyvinyl butyral (PVB) resin contained in the easily-peelable paint composition is less than 30 parts by weight based on the total weight, coating solution stability deteriorates and coating properties are poor, causing a difficulty in forming a coating film. When an amount of the PVB resin contained in the easily-peelable paint composition is more than 80 parts by weight based on the total weight, it is difficult to prepare a paint including a pigment. Accordingly, the PVB resin is contained in the easily-peelable paint composition in an amount of 20 to 80 parts by weight, preferably 35 to 65 parts by weight, based on 100 parts by weight of the whole paint composition.

The easily-peelable paint composition may further include a thickener. The thickener serves to improve the storage stability and the viscosity of the composition to improve coating properties. Examples of the thickener may include cellulose, an acrylic thickener, a urethane thickener, wax, and clay. These may be used alone or in combination of two or more.

When the thickener is contained in an amount of 2 parts by weight or more, viscosity and thixotropic properties are too high to form a coating film. On the other hand, when the thickener is contained in an amount of less than 0.2 parts by weight, viscosity is too low to apply the composition because it may flow down like water. Therefore, it is advantageous that the thickener is contained in the easily-peelable paint composition in an amount of 0.2 to 2 parts by weight, preferably 0.3 to 1.5 parts by weight, based on 100 parts by weight of the whole paint composition.

The additive may include an antifoaming agent and a functional additive other than the antifoaming agent, such as a leveling agent, a wetting dispersant, a preservative, or an antifreezing agent. These may be used alone or in combination of two or more. The additive is generally used to uniformly maintain the workability and the physical properties of the easily-peelable paint composition.

In addition, the easily-peelable paint composition of the present disclosure may further include a releasing additive. The releasing additive may be included in the easily-peelable paint composition of the present disclosure so that the easily-peelable paint composition can be easily peeled off from the material to which the paint composition is applied, thereby improving peelability.

The releasing additive, which is provided to secure the improvement in peelability of the coating film, may increase releasability or improve the cohesion of the resin to decrease adhesion between the paint and the surface of the material, thereby increasing the peeling effect. Preferably, the releasing additive may be a silicone oil, a silicone polymer, a silicone emulsion, a modified silicone oil or polymer, a siloxane or modified siloxane, a silicone rubber, a wax-type additive, a surfactant, an oil, a silane, or the like. However, if a releasing additive other than the silicone oil or polymer is used as the releasing additive for improving peelability, the releasing additive needs to be used in an excess, which causes a peelable paint to have problems in terms of durability, thickness of coating film, strength of coating film, and the like. Thus, the silicone polymer or oil (modified silicone oil or polymer) is suitable for the releasing additive contained in the easily-peelable paint composition of the present disclosure. It is preferable that the releasing additive is contained in the easily-peelable paint composition in an amount of 1 to 20 parts by weight, preferably 3 to 15 parts by weight, based on 100 parts by weight of the whole paint composition.

In addition, the easily-peelable paint composition of the present disclosure may further contain an inorganic material. The inorganic material is contained in the easily-peelable paint composition of the present disclosure so that the easily-peelable paint composition can be easily peeled off from the material to which the paint composition is applied, thereby improving peelability.

The inorganic material, which is provided to secure the peelability of the coating film, may increase the releasability of the easily-peelable paint composition to decrease adhesion between the paint and the surface of the material, thereby increasing the peeling effect. In addition to the peeling effect, the inorganic material may have a paint amount increasing effect, and serve to improve coating properties and improve the strength of the coating film. Preferably, the inorganic material may include any one or a combination selected from the group consisting of $SiO_2$, $CaCO_3$, $BaSO_4$, talc, $Al(OH)_3$, and $TiO_2$.

A particle size (µm) of the inorganic material may be controlled to increase a support effect and suppress permeability, and a resin/inorganic material ratio may be controlled to improve peelability while maintaining existing physical properties such as durability, strength of coating film, and thickness of coating film. The inorganic material may be contained in the easily-peelable paint composition in an amount of 5 to 40 parts by weight, preferably 10 to 30 parts by weight, based on 100 parts by weight of the whole paint composition.

The easily-peelable paint composition having the above-mentioned composition is advantageous in that it can be easily peeled off, if necessary, after being applied to a material such as not only wallpaper but also wood or glass, thereby making it possible to recover the material to its original condition. It should be noted that a material such as paper having weak internal cohesion between ingredients of the material with many pores, which may cause interlayer separation, has high adhesion with the paint, making it difficult to peel off a coating layer from the paper.

In addition, the easily-peelable paint composition may further include a pigment for identifying a painted portion. Examples of the pigment may include an extender pigment, a colored pigment, and a combination thereof. In a case where the pigment is contained in the easily-peelable paint composition, when the pigment is contained in an amount of more than 30 parts by weight, the stability of the paint deteriorates, and the paint fails to play its role properly, as a result peeling off a coating film in a poor state. Thus, the pigment may be contained in the easily-peelable paint composition in an amount of 5 to 30 parts by weight, preferably 5 to 20 parts by weight, based on 100 parts by weight of the whole paint composition.

The solvent included in the easily-peelable paint composition is used to secure the painting workability of the easily-peelable paint composition. Preferably, the solvent may further include any one or more of cellosolves and carbitols in addition to water. These may be used in combination of two or more. When the solvent is used in the point in a small amount, a drying time may be short, and when the solvent is used in the paint in a large amount, a drying time may be long.

EXAMPLES

[Experimental Example 1]: Preparation of Easily-Peelable Paint Composition Containing PVB Resin Example 1

While stirring 70 g of PC-2 as a water-dispersible PVB resin, 10 g of a water-dispersible white pigment capable of exhibiting color was added. Thereafter, 15 g of water was added and mixed well for 10 minutes. While stirring continuously, 4 g of TT-935D was added as a thickener to increase a viscosity of a paint, and an rpm of a stirrer was increased to facilitate the mixing. After stirring at a high speed for 30 to 60 minutes or more, 1 g of F-810 was mixed as an antifoaming agent suppressing bubbles and destroying generated bubbles, and then stirred at a high speed for 30 minutes or more to prepare a paint of Example 1.

Experimental Results

The paint of Example 1 was applied onto a wallpaper specimen at a thickness of 50 to 100 µm using an airless spray, a roller (brush), or the like, and then dried. A coating film formed after leaving the specimen for 1 month was checked for peelability and physical properties, and the results were obtained as shown in Table 1. The physical properties were evaluated in the following manner
    Measurement of Peelability: When peeling off (removing) the film coated on the wallpaper after 1 day, its condition was evaluated in five stages (evaluated together with a condition of the material after peeling off the film)—5: excellent, 4: good, 3: normal, 2: poor, and 1: bad.
    Measurement of Strength of Coating Film: An elasticity and a tearing condition of the dried film when pulled were evaluated in five stages—5: excellent, 4: good, 3: normal, 2: poor, and 1: bad.

Measurement of Smoothness of Coating Film: A surface smoothness and an applied condition of the dried film were evaluated with naked eyes in five stages—5: excellent, 4: good, 3: normal, 2: poor, and 1: bad.

Measurement of Compatibility: The final paint was stored in a transparent sample container, and its sedimentation, layer separation, and emulsion condition were measured—◉: excellent, ○: good, ◇: normal, Δ: poor, and X: bad.

Measurement of Gloss: A glossiness of the dried film was measured in four stages—gloss ◉: high gloss, ○: egg shell gloss, Δ: semi gloss, and X: matt.

Measurement of Surface Condition: A particle condition of the dried film was evaluated with naked eyes and by touch—good, normal, and bad.

Measurement of Storage Stability: The final paint was stored in a transparent sample container, and its sedimentation, layer separation, emulsion condition, and the like were measured—storage stability ◉: excellent, ○: good, ◇: normal, Δ: poor, and X: bad.

Measurement of Tensile Rate: A length to which the dried film (20*100 mm) is stretched when pulled was compared by %.

Measurement of Glass Transition Temperature: A glass transition temperature was measured using differential scanning calorimetry (DSC) equipment.

Measurement of Peelability: When peeling off (removing) the film coated on silk (PVC) wallpaper after 1 day, its condition was evaluated in five stages (evaluated together with a condition of the material after peeling off the film)—peelability ◉: excellent, ○: good, ◇: normal, Δ: poor, and X: bad.

TABLE 1

| | Peelability | Strength of coating film | Smoothness of coating film | Compatibility | Gloss | Surface condition |
|---|---|---|---|---|---|---|
| Example 1 | 2 | 5 | 3 | ◉ | ◉ | good |

As shown in Table 1 above, it was confirmed that the paint containing a PVB resin had a certain degree of peelability with respect to the wallpaper, and the paint containing a PVB resin was evaluated as being excellent in terms of strength of coating film, compatibility, gloss, and surface condition. It should be noted that paper has weak internal cohesion with many pores, which may easily cause interlayer separation, and thus has relatively poor peelability as compared with glass or the like.

[Experimental Example 2]: Comparison of Physical Properties Between Paint Compositions Depending on Molecular Weight of PVB Examples 2 to 5

While stirring 60 g of a PVB emulsion resin having a molecular weight as shown in Table 2 below, 11 g of water was added and mixed for 10 minutes. Thereafter, 1 g of F-810 (Tego) was mixed as an antifoaming agent suppressing bubbles and destroying generated bubbles while stirring continuously and stirred at a high speed for 30 minutes or more to prepare a paint composition of each of Examples 2 to 5 according to the present disclosure.

TABLE 2

| Classification | Molecular weight of PVB (g/mole) |
|---|---|
| Example 2 | 100,000 to 160,000 |
| Example 3 | 160,000 to 210,000 |
| Example 4 | 50,000 to 90,0000 |
| Example 5 | 220,000 to 280,000 |

The easily-peelable paint composition was tested for physical properties depending on the molecular weight of the PVB, and the results were obtained as shown in Table 3. The physical properties of the paint composition were evaluated in the following manner Measurement of Transparency: A transparent condition of the film was measured using a transmittance, and determined in five stages (relative evaluation)—transmittance ◉: excellent, ○: good, ◇: normal, Δ: poor, and X: bad.

TABLE 3

| Classification | Transparency | Storage stability | Tensile rate | Tg (° C.) | Peelability |
|---|---|---|---|---|---|
| Example 2 | ◉ | ◉ | 160 to 180 | 70 to 76 | ◉ |
| Example 3 | ◉ | ◉ | 160 to 180 | 70 to 76 | ◉ |
| Example 4 | ◉ | ○ | 120 to 150 | 65 to 72 | ◇ |
| Example 5 | ◇ | ◇ | 140 to 160 | 77 to 84 | ○ |

Referring to the experimental results of Table 3 above, it was confirmed that in Examples 2 and 3, in which the PVB resin had a molecular weight of 100,000 to 210,000 g/mole, the peeling effect was excellent, and the storage stability and the tensile rate were also best. On the other hand, it was confirmed that in Examples 4 and 5, in which the PVB resin had a molecular weight of less than 100,000 g/mole or more than 210,000 g/mole, the peeling and storage stability effects were relatively poor.

[Experimental Example 3]: Comparison of Physical Properties Between Paint Compositions Depending on Particle Size of PVB Examples 6 to 9

In order to analyze physical properties of a paint composition depending on a particle size of a PVB resin having a molecular weight of 100,000 to 160,000 g/mole, a PVB emulsion resin having a particle size range as shown in Table 4 below was used in preparing a paint composition of each of Examples 6 to 9 in the same manner as in Experimental Example 2. Thereafter, the respective physical properties of the paint compositions prepared were measured.

TABLE 4

| Classification | Particle size μm | Transparency | Storage stability | Tensile rate | Peelability |
|---|---|---|---|---|---|
| Example 6 | 70 to 100 | ○ | ○ | 80 to 100 | ◇ |
| Example 7 | 100 to 160 | ◇ | ○ | 110 to 140 | ○ |

TABLE 4-continued

| Classification | Particle size μm | Transparency | Storage stability | Tensile rate | Peelability |
|---|---|---|---|---|---|
| Example 8 | 170 to 240 | ◇ | ◉ | 150 to 180 | ◉ |
| Example 9 | 240 to 300 | Δ | X | 120 to 160 | Δ |

Referring to the experimental results of Table 4 above, it was confirmed that in Example 8, in which the PVB resin had a particle size of 170 to 240 μm, not only the peelability but also the tensile rate and the storage stability were best.

[Experimental Example 4]: Check of Resin Components that May be Additionally Contained Examples 10 to 21

In order to check components that may be further contained, in addition to the PVB resin (Example 8), in the easily-peelable paint composition according to the present disclosure, a vinyl copolymer (an acrylic emulsion having a methacryl acid MAA:acryl acid AA:itaconic acid weight ratio of 7:2:1), a polyacetate emulsion (PVAc, acetate content: 7 wt %), polyvinyl alcohol (PVOH), or an SBR latex emulsion (KSL341) was mixed in a weight ratio as shown in each of Tables 5 to 8 below, and then a paint composition of each of Examples 10 to 21 was prepared in the same manner as in Experimental Example 3. Thereafter, the respective physical properties of the paint compositions prepared were measured in the same manner as described in Experimental Example 3, and a strength of coating film, which was added, was measured in the following manner
- Strength of Coating Film: An elasticity, a tearing condition, and the like of the dried film when pulled were evaluated in five stages—strength of coating film ◉: excellent, ◯: good, ◇: normal, Δ: poor, and X: bad.

TABLE 5

| Classification | PVB:acrylic resin (weight ratio) | Transparency | Storage stability | Strength of coating film | Peelability |
|---|---|---|---|---|---|
| Example 10 | 9:01 | ◇ | ◇ | ◇ | ◯ |
| Example 11 | 7:03 | X | X | X | X |
| Example 12 | 5:05 | X | X | X | X |

TABLE 6

| Classification | PVB:PVAc (weight ratio) | Transparency | Storage stability | Strength of coating film | Peelability |
|---|---|---|---|---|---|
| Example 13 | 9:1 | ◇ | ◯ | ◇ | ◇ |
| Example 14 | 7:3 | Δ | Δ | Δ | Δ |
| Example 15 | 5:5 | X | X | X | X |

TABLE 7

| Classification | PVB:PVOH (weight ratio) | Transparency | Storage stability | Strength of coating film | Peelability |
|---|---|---|---|---|---|
| Example 16 | 9:1 | ◉ | ◯ | ◯ | ◉ |
| Example 17 | 7:3 | ◯ | ◇ | Δ | ◯ |
| Example 18 | 5:5 | ◯ | ◇ | Δ | ◯ |

TABLE 8

| Classification | PVB:latex (weight ratio) | Transparency | Storage stability | Strength of coating film | Peelability |
|---|---|---|---|---|---|
| Example 19 | 9:1 | ◉ | ◯ | ◉ | ◯ |
| Example 20 | 7:3 | ◯ | ◇ | ◇ | ◇ |
| Example 21 | 5:5 | ◇ | ◇ | ◇ | X |

Referring to Tables 5 to 8, it was confirmed that, when the PVOH or latex component was mixed with the PVB resin in a predetermined weight ratio, the same or better effect was caused in terms of any one or more of transparency, storage stability, strength of coating film, and storage stability. In particular, it was seen that when the weight ratio of PVB: PVOH or PVB:latex was 9:1, the best peeling effect was caused among used mixtures. Meanwhile, it was confirmed that the effect might be reduced in terms of any one or more of transparency, storage stability, strength of coating film, and storage stability as the additional component content increases above a predetermined standard and the PVB content decreases below a predetermined level. FIGS. 1 and 2 show photographs of experiments on peelability and transparency with respect to glass and silk (PVC) wallpaper depending on a content ratio between PVB (Example 8) and latex as listed in Table 9 below.

TABLE 9

| Classification | PVB:latex (weight ratio) |
|---|---|
| #1 | PVB alone |
| #11 | PVB:latex = 9:1 |
| #12 | PVB:latex = 7:3 |
| #13 | PVB:latex = 5:5 |

As shown in FIG. 1, with respect to the glass, it was confirmed that the transparency was excellent in the following order: #1>#11>#12>#13, and the peelability was excellent in the following order: #1>#11>#12>>#13. As shown in FIG. 2, with respect to the silk (PVC) wallpaper, the transparency was excellent in the following order: #1>#11>#12>#13, and the peelability was excellent in the following order: #1>>#11>>#12>>>#13.

[Experimental Example 5]: Preparation of Easily-Peelable Paint Composition Containing Releasing Additive Example 22

While stirring 60 g of PC-2 (Shark-Solutions) as a water-dispersible PVB resin, 15 g of a water-dispersible white pigment (Wooshin Pigment) capable of exhibiting color and characteristics of an inorganic material was added. Thereafter, 11 g of water was added and mixed well for 10 minutes. While stirring continuously, 5.5 g of TT-935D (Dow Chemical) was added as a thickener to increase a viscosity of a paint, and an rpm of a stirrer was increased to facilitate the mixing. After stirring at a high speed for 30 to 60 minutes or more, 7.5 g of PMX200F (Saehan Silichem) was mixed as a silicone releasing additive capable of improving peelability, and 1 g of F-810 (Tego) was mixed as an antifoaming agent suppressing bubbles and destroying generated bubbles, and then stirred at a high speed for 30 minutes or more to prepare an easily-peelable paint composition according to the present disclosure.

Examples 23 to 29

An easily-peelable paint composition according to each of Examples 23 to 29 was prepared in the same manner as in Example 22, but with the composition and content described in Table 10 below.

TABLE 10

| Material name | Resin PC-2 | H₂O — | Thickener TT-935D | Pigment White pigment | Antifoaming agent F-810 | PMX200F | MEM3345 | PMX50 | HV495 | PMX0345 | PMX0245 |
|---|---|---|---|---|---|---|---|---|---|---|---|
| | | | | | | Releasing additive | | | | | |
| Example 22 | 60 | 11 | 5.5 | 15 | 1.0 | 7.5 | | | | | |
| Example 23 | 60 | 11 | 5.5 | 15 | 1.0 | | 7.5 | | | | |
| Example 24 | 60 | 11 | 5.5 | 15 | 1.0 | | 20 | | | | |
| Example 25 | 60 | 11 | 5.5 | 15 | 1.0 | | 25 | | | | |
| Example 26 | 60 | 9 | 5 | 15 | 1.0 | | | 10 | | | |
| Example 27 | 60 | 9 | 5 | 15 | 1.0 | | | | 10 | | |
| Example 28 | 60 | 9 | 5 | 15 | 1.0 | | | | | 10 | |
| Example 29 | 60 | 9 | 5 | 15 | 1.0 | | | | | | 10 |

[Experimental Example 6]: Preparation of Easily-Peelable Paint Composition Containing Inorganic Material

Example 30

While stirring 60 g of PC-2 (Shark-Solutions) as a water-dispersible PVB resin, 20 g of a water-dispersible white pigment (Wooshin Pigment) capable of exhibiting color and characteristics of an inorganic material was added. Thereafter, 14 g of water was added and mixed well for 10 minutes. While stirring continuously, 3 g of TT-935D (Dow Chemical) was added as a thickener to increase a viscosity of a paint and an rpm of a stirrer was increased to facilitate the mixing. After stirring at a high speed for 30 to 60 minutes or more, 2 g of $SiO_2$ (5 μm) (SOLVAY) was added as an inorganic material capable of improving peelability and improving coating properties of the paint and stirred at a high speed for 60 minutes or more, and then 1 g of F-810 (Tego) was mixed as an antifoaming agent suppressing bubbles and destroying generated bubbles and stirred at a high speed for 30 minutes or more to prepare an easily-peelable paint composition according to the present disclosure.

Examples 31 to 37

An easily-peelable paint composition according to each of Examples 31 to 37 was prepared in the same manner as in Example 30, but with the composition and content described in Table 11 below.

TABLE 11

| Material name | Resin PC-2 | H₂O — | Thickener TT-935D | Pigment White pigment | Antifoaming agent F-810 | SiO₂ (5 μm) | CaCO₃ (5 μm) | CaCO₃ (20 μm) | BaSO₄ (2 μm) | BaSO₄ (10 μm) | Talc |
|---|---|---|---|---|---|---|---|---|---|---|---|
| | | | | | | Inorganic material | | | | | |
| Example 30 | 60 | 14 | 3 | 20 | 1.0 | 3 | | | | | |
| Example 31 | 60 | 15 | 2 | 20 | 1.0 | 3 | | | | | |
| Example 32 | 60 | 9.5 | 5 | 18 | 1.0 | | 7.5 | | | | |
| Example 33 | 60 | 9.5 | 5 | 17 | 1.0 | | | 7.5 | | | |
| Example 34 | 60 | 7 | 5 | 17 | 1.0 | | | | 10 | | |
| Example 35 | 60 | 7 | 5 | 17 | 1.0 | | | | | 10 | |

TABLE 11-continued

| | | | | | Classification | | | | | |
| | | | | Pigment | Antifoaming | Inorganic material | | | | |
| Material name | Resin PC-2 | H$_2$O | Thickener TT-935D | White pigment | agent F-810 | SiO$_2$ (5 μm) | CaCO$_3$ (5 μm) | CaCO$_3$ (20 μm) | BaSO$_4$ (2 μm) | BaSO$_4$ (10 μm) | Talc |
|---|---|---|---|---|---|---|---|---|---|---|---|
| Example 36 | 60 | 7 | 5 | 17 | 1.0 | | | | | 10 | |
| Example 37 | 60 | 7 | 5 | 17 | 1.0 | | | | | | 10 |

The paint of each of Examples 22 to 29 and Examples 30 to 37 according to Experimental Examples 5 and 6, respectively, was applied onto a wallpaper specimen at a thickness of 50 to 100 μm using an airless spray, a roller (brush), or the like, and then dried. A coating film formed after leaving the specimen for 1 month was checked for peelability and physical properties. The physical properties were evaluated in the same manner as in Experimental Example 1, and the evaluation results are shown in Table 12 for [an easily-peelable paint containing a releasing additive] and Table 13 for [an easily-peelable paint containing an inorganic material]. (The higher the number, the better the peelability and the strength of the coating film: scores 1 to 5.)

TABLE 12

| | Peelability | Strength of coating film | Surface condition | Compatibility | Gloss |
|---|---|---|---|---|---|
| Example 22 | 3 | 2 | Stained | Δ | X |
| Example 23 | 1 | 4 | Good | ○ | ○ |
| Example 24 | 3 | 1 | Good | Δ | Δ |
| Example 25 | 3 | 1 | Good | Δ | Δ |
| Example 26 | 3 | 2 | Slightly stained | ○ | ◎ |
| Example 27 | 1 | 4 | Slightly stained | X | ◎ |
| Example 28 | 4 | 1 | Slightly stained | ○ | ◎ |
| Example 29 | 4 | 1 | Slightly stained | ○ | ◎ |

TABLE 13

| | Peelability | Strength of coating film | Smoothness of coating film | Compatibility | Gloss | Liquid state |
|---|---|---|---|---|---|---|
| Example 30 | 2 | 2 | 1 | ○ | X | Creamy |
| Example 31 | 3 | 2 | 3 | X | X | Liquid |
| Example 32 | 3 | 4 | 2 | ◎ | ◎ | Creamy |
| Example 33 | 3 | 4 | 3 | ◎ | ◎ | Liquid |
| Example 34 | 4 | 3 | 2 | ◎ | Δ | Creamy |
| Example 35 | 4 | 3 | 2 | ◎ | Δ | Creamy |
| Example 36 | 4 | 3 | 2 | ◎ | Δ | Creamy |
| Example 37 | 3 | 3 | 3 | ◎ | ○ | Liquid |

Referring to Tables 12 and 13, it was confirmed that when the releasing additive or the inorganic material was contained, better peelability was caused. (The peeling effect was higher than that in Example 1, in which the releasing additive or the inorganic material was not contained.)

FIGS. 3 and 4 show tests of paints of the present disclosure for peelability when applied to wallpaper. A of FIG. 3 and A' of FIG. 4 show an applied condition and a peeled-off condition of a paint containing no releasing additive and no inorganic material (Example 1), respectively.

B of FIG. 3 and B' of FIG. 4 show an applied condition and a peeled-off condition of a paint containing a releasing additive (Example 26), respectively, and C of FIG. 3 and C' of FIG. 4 show an applied condition and a peeled-off condition of a paint containing an inorganic material as an additive (Example 33), respectively.

Based thereon as well, it can be seen that the peeling effect is better with respect to wallpaper when at least the releasing additive or the inorganic material is contained.

Although the easily-peelable paint composition according to the present disclosure has been described above, the present disclosure is not limited to the above-described embodiments and may be modified in various forms within the scope of the technical spirit to which the present disclosure falls.

The invention claimed is:

1. An easily-peelable paint composition that is easy to peel off from an object, the easily-peelable paint composition comprising:
    based on 100 parts by weight of the whole paint composition,
    30 to 80 parts by weight of a polyvinyl butyral (PVB) resin;
    1 to 5 parts by weight of an additive comprising an antifoaming agent;
    5 to 30 parts by weight of a pigment; and
    the balance of the composition comprising an aqueous solvent comprising water;
    wherein the PVB resin has a molecular weight of 100,000 to 210,000 g/mole,
    wherein the PVB resin has a particle size of 170 to 240 μm,
    wherein the PVB resin is emulsified and dispersed in the aqueous solvent, and
    wherein the object comprises paper and has a porous surface, the easily-peelable paint composition forms a dried film on the object comprising paper and is easily peelable from the object comprising paper to restore the object to its original condition.

2. The easily-peelable paint composition of claim 1, wherein
    the aqueous solvent further comprises any one or more of alcohols, cellosolves, and carbitols.

3. The easily-peelable paint composition of claim 1, further comprising an additional component comprising latex, an acrylic copolymer, polyvinyl acetate, urethane, or polyvinyl alcohol.

4. The easily-peelable paint composition of claim 3, wherein
a weight ratio of the PVB resin to the additional component is 9 to 12:1.

5. The easily-peelable paint composition of claim 1, further comprising
1 to 20 parts by weight of a releasing additive, the releasing agent being one or more selected from the group consisting of a silicone oil, a silicone polymer, a silicone emulsion, a modified silicone oil or polymer, a siloxane or modified siloxane, a silicone rubber, a wax-type additive, an oil, and a silane.

6. The easily-peelable paint composition of claim 1, further comprising
5 to 40 parts by weight of an inorganic material for improving peelability, wherein the inorganic material is selected from the group consisting of $SiO_2$, $CaCO_3$, $BaSO_4$, talc, $Al(OH)_3$, and $Al_2O_3$.

* * * * *